United States Patent [19]

Kerr, Jr.

[11] Patent Number: 4,909,405

[45] Date of Patent: Mar. 20, 1990

[54] INTERJOIST HANGER ASSEMBLY AND ATTACHABLE SUPPORT BOX THEREFOR

[76] Inventor: Jack R. Kerr, Jr., 6017 Meadowside, Arlington, Tex. 76017

[21] Appl. No.: 337,341

[22] Filed: Apr. 13, 1989

[51] Int. Cl.$^4$ ............................................. H02G 3/08
[52] U.S. Cl. ...................................... 220/3.9; 220/3.2; 248/546; 248/27.1; 248/57; 248/906
[58] Field of Search .................... 248/544, 546, 27.1, 248/57, DIG. 6, 343, 344, 906; 220/3.2, 3.9, 3.92, 3.3, 3.0; 411/188, 187, 956, 964, 970, 144, 143, 936, 230

[56] References Cited

U.S. PATENT DOCUMENTS

| | | | |
|---|---|---|---|
| 711,823 | 10/1902 | Cavallaro | 411/143 |
| 1,537,780 | 5/1925 | Obringer . | |
| 2,140,861 | 12/1938 | Steketeg | 247/22 |
| 2,374,993 | 5/1945 | Haynes | 220/3.3 |
| 2,448,001 | 8/1948 | Maurette | 248/343 |
| 2,671,821 | 3/1954 | Zientowski et al. | 174/54 |
| 3,518,421 | 6/1970 | Cogdill | 240/85 |
| 4,079,487 | 3/1978 | Coop, Sr. | 411/936 X |
| 4,405,111 | 9/1983 | Lennon | 248/544 |
| 4,463,923 | 8/1984 | Reiker | 248/546 |
| 4,513,940 | 4/1985 | Alperin et al. | 248/674 |
| 4,513,994 | 4/1985 | Dover et al. | 248/544 |
| 4,518,141 | 5/1985 | Parkin | 248/546 |
| 4,538,786 | 9/1985 | Manning | 248/544 |
| 4,659,051 | 4/1987 | Propp et al. | 248/546 |
| 4,684,092 | 8/1987 | Reiker | 248/200.1 |
| 4,788,383 | 11/1988 | Caison | 248/DIG. 6 X |

FOREIGN PATENT DOCUMENTS 0553459 2/1958 Canada ................... 248/205 R

OTHER PUBLICATIONS

Invent Invest, Inc., (Photo).
Fanfast, (Photo).

Primary Examiner—Ramon S. Britts
Assistant Examiner—Daniel Hulseberg
Attorney, Agent, or Firm—Daniel Rubin

[57] ABSTRACT

An interjoist hanger assembly for supporting items to be hung is formed of a pair of elongated tubular sleeves interfitting telescopically slidable one within the other. Supported at the distal end of each of the sleeves is an axial screw and a floating collar having circumferentially distributed axially extending prongs or teeth. The sleeves effect an interlock when collapsed whereby they can be rotated in unison for threading one end into an adjacent joist. When the sleeves are expanded, the opposite sleeve end can be similarly threaded into the opposite joist. With each threaded attachment, the prongs of the surrounding collar are drawn into a gripping engagement with the joist surface thereat.

A saddle secured snap fit onto the outer sleeve includes side flanges to which an electrical outlet box can be mounted for attachment of an item to be hung. A first modification of the box for increasing load capacity utilizes elongated load screws extending from the top side of the box into a threaded engagement with the underlying ears to enable load handling capacity to be increased to on the order of about 55 pounds per ear. A further modification utilizes side clips extending between the latter screws and about the box exterior to enable increasing the box loading to on the order of about 200 pounds per ear. As an alternative, the side clips can be utilized without the load screws for achieving a gain in load handling capacity to on the order of 55 pounds per ear. The entire assembly can be installed by an average workman through a four inch wall opening at the side of installation utilizing only one hand while standing interior of the space in which hanging is to be effected.

21 Claims, 2 Drawing Sheets

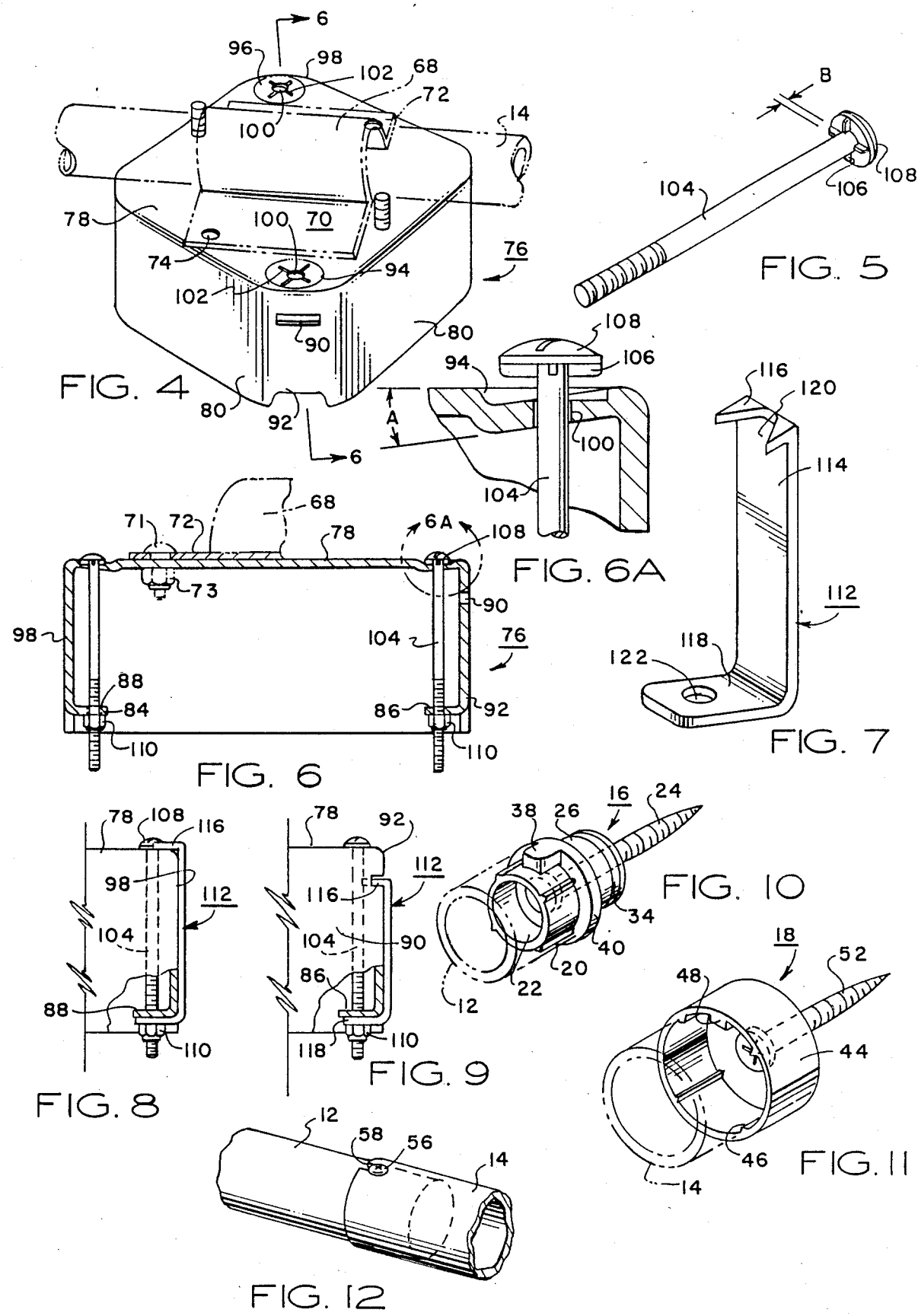

INTERJOIST HANGER ASSEMBLY AND ATTACHABLE SUPPORT BOX THEREFOR

TECHNICAL FIELD

The field of art to which the invention pertains comprises the art of support structures by which to hang relatively heavy units such as ceiling fans, light fixtures, etc. from an existing wall or ceiling.

BACKGROUND OF THE INVENTION

In new building construction or in existing building construction where the wood joists or studs are completely exposed and readily accessible, providing additional structural support at the mounting site of a ceiling fan or a relatively heavy light fixture can be readily effected by well-known forms of brackets, bracing, etc. However, for a wall or ceiling mounting of a ceiling fan, relatively heavy light fixture, potted plant, etc. in existing building structures without ready access to the studs or joists, installation becomes considerably more difficult if removal of the wall or ceiling board is to be avoided.

Where the ceiling is between floors of a multi-story structure, installation can prove particularly troublesome. At the same time, the standard electrical box from which many fixtures are frequently hung cannot safely support more than about a 10 pound static load. However, units to be mounted such as ceiling fans for example, represent from about a 25 pound to about a 100 pound dynamic load such that a reasonably complex reinforcement of the electrical box has been utilized.

It has been common in order to achieve adequate support in the above situations to utilize a commercially available form of interjoist hanger assembly. The assembly is typically secured transversely to the stud/joists behind the wallboard above the four inch box opening at the mounting site. Pursuant to the requirements of the National Electric Code 370-17, installation of supported items such as ceiling fans are not to be directly supported from the box ears. Therefore, typically utilized in combination with the hanger assembly dependently supported at the opening is a modified electrical outlet box reinforced to accommodate the load value sought to be supported.

BACKGROUND OF THE PRIOR ART

Various devices have been proposed for interjoist hanger support that can be installed through a four inch opening normally provided in a wall or ceiling for an electrical outlet box. Exemplifying such devices are the disclosures of U.S. Pat. Nos. 2,140,861; 3,518,421; 4,405,111; and 4,463,923. Installation of these units generally require two workmen working together along with complete access to the work area.

A particularly effective prior art hanger assembly for these purposes is the hanger structure disclosed in U.S. Pat. No. 4,659,051 of which I am a co-inventor. The '051 patent is incorporated herein by reference and discloses a hanger assembly utilizing a threaded expansion bolt in cooperation with a tubular sleeve for expanding the hanger unit transversely between adjacent wood joists. The assembly includes rotatably supported opposite end screws threadedly matched to the bolt threads and each surrounded by a floating swivel having axially directed prongs or teeth. When the bolt is unextended, the unit can be readily inserted through the four inch box opening in the wallboard. When fully extended, the end screws and surrounding teeth can be caused to engage and secure the hanger assembly to the opposite joists or studs thereat.

While the hanger assembly of the '051 patent has functioned well, it has been noted that when improperly installed, a tendency is incurred for the bolt to misalign. Because of the imposed lateral force, this has caused occasional stripping of the end screws and/or some jacking apart of the ceiling joists or wall studs. At the same time, some of the hanger components particularly the collars, require machined preparation which has contributed to a somewhat higher than expected production cost. Moreover, installation of the unit thereof within the confined working space between joists has typically been sufficiently troublesome to require an excessive installation time of eighteen minutes on average for installation by an experienced workman. For load reinforcement of an associated electrical outlet box, a relatively complex and somewhat costly modification has been utilized.

Despite recognition of the foregoing, an improved and superior hanger assembly structure able to overcome the mentioned limitations has not heretofore been known.

OBJECTS OF THE INVENTION

It is an object of the invention to provide an improved and superior hanger assembly for interjoist positioning that is installable so as to eliminate the possibility of jacked separation of the joists in the manner of similar purpose assemblies of the prior art.

It is a further object of the invention to provide an improved hanger assembly that eliminates many of the costly manufacturing features associated with the similar purpose hanger assemblies of the prior art so as to effect a significant reduction in the manufacturing cost thereof.

It is yet a further object of the invention to provide an improved hanger assembly of the previous objects affording a significantly simplified installation technique so as to reduce the average time of installation from about 18 minutes on the average to about 5-6 minutes on the average.

It is a still further object of the invention to provide an improved electrical outlet box with simplified modifications for selectively increasing load capacity of the box.

SUMMARY OF THE INVENTION

This invention relates to a novel hanger assembly and a cooperating support box for supporting a relatively heavy hanging load juxtaposed to a wall or ceiling surface. More specifically, the invention relates to a novel assembly for interjoist installation in combination with a cooperative electrical outlet box affording substantially increased load capacity to support a statically or dynamically heavy fixture such as a ceiling fan, light fixture, planter, etc.

By means of the hanger assembly structure hereof, the unit can be installed by one workman employing one hand extending through a four inch opening in the wall or ceiling at the site where installation is to be effected. Operational construction thereof enables previous joist jacking to be eliminated. At the same time, both the cost of manufacturing and average installation time are substantially reduced as compared to similar purpose devices of the prior art. The benefits thereof are many including the realization of significant cost savings in both product manufacture and installation labor.

The foregoing is achieved in accordance with the invention hereof by means of a hanger assembly comprised of a pair of elongated tubular sleeves interfitting telescopically slidable one within the other. The tubes are cradle supported at their distal ends to ensure horizontal alignment during installation. Each of the ends are fitted with an axially extending screw surrounded by a floating collar having circumferentially distributed axially extending prongs or teeth. When the tubes are withdrawn in a collapsed fully overlapping relation, an interlock between tubes is provided whereby the tubes can be rotated in unison for threading and securing one end to one of the wood joists. In the course of threading the prong or teeth of the associated collar are drawn into the joist in a firm anchoring engagement. After installation of the first end is completed, the tubes are telescopically expanded enabling the other end to be similarly rotated free of the interlock to secure the other end to the opposite joist. Once both ends are secured, a closely fitted saddle with side flanges is snap fit onto the tubes at the site of the ceiling opening.

A modified electrical outlet box that can be utilized with the above described hanger assembly or without the hanger assembly if direct joist or stud mounting is available, is adapted to be secured onto the underside of the saddle flanges. The box is provided with two localized surface indentations at an upper surface location and an aperture within the indentations is vertically aligned with the threaded aperture of the conventional dog ears at the underside of the box. The indentations include surface serrations arranged to receive radial teeth formed on the head underside of an elongated roundhead load screw. With the load screws previously positioned rotatably interlocked on the serrations and extending through the aperture threadedly engaged through the dog ears, a reinforced structural section is formed about the box thereat so as to increase the box load capacity from about 10 pounds per ear to about 55 pounds per ear. With the optional use of auxiliary side clips in combination with the inserted load screws, reinforcement of the box can be further enhanced so as to increase the box load capacity to about 200 pounds per ear. Alternatively, the side clips can be utilized without the mentioned load screws so as to similarly effect an increase of load capacity to about 55 pounds per ear.

The features and advantages of the invention will be appreciated by those skilled in the art upon reading the detailed description which follows in conjunction with the drawings.

BRIEF DESCRIPTION OF THE DRAWINGS

FIG. 4 is a top perspective view of an electrical outlet box as modified in accordance herewith;

FIG. 5 is a perspective view of a load screw to be utilized in conjunction with the outlet box of FIG. 4;

FIG. 6 is a sectional view as seen substantially from the position 6—6 of FIG. 4;

FIG. 6A is a fragmentary enlargement of the encircled portion of FIG. 6;

FIG. 7 is a perspective view of an auxiliary clip as can be optionally employed with the outlet box of FIG. 4;

FIGS. 8 and 9 are fragmentary side views illustrating use of the clip of FIG. 7 on the box of FIG. 4;

FIG. 10 is a perspective view of one screw and end closure utilized at one end in the hanger assembly of FIG. 1;

FIG. 11 is a perspective view of the other screw and end closure as utilized at the opposite end of the hanger assembly of FIG. 1;

FIG. 12 is a fragmentary view of a portion of the hanger assembly of FIG. 1 for effecting a tubular interlock for joist or stud spacing installations greater than about 16 inch.

DESCRIPTION OF THE PREFERRED EMBODIMENT

Figure 1:
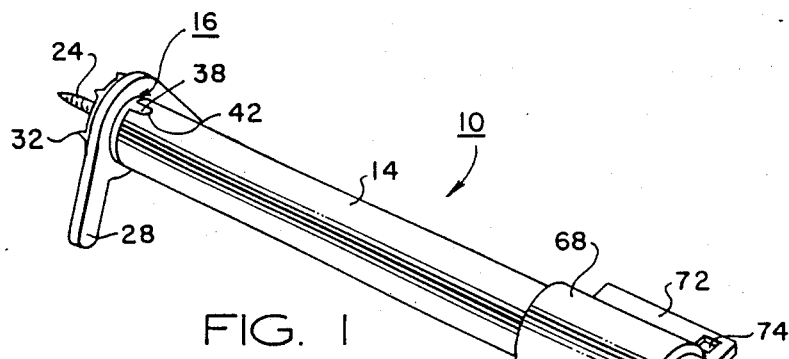
FIG. 1 is a perspective view of the hanger assembly support unit of the invention.

In the description which follows, like parts are marked throughout the specification and drawings with the same reference numerals respectively. The drawing figures are not necessarily to scale and the proportions of certain parts may have been exaggerated for purposes of clarity.

Referring now to FIGS. 1-3 and 10-12, the hanger assembly hereof is designated 10 and is comprised of two elongated tubular members 12 and 14 telescopically slidable one within the other. The distal ends of each tube includes a closure member seen as viewed in the drawings, to comprise a closure plug 16 at the left end and a closure cap 18 at the right end. Each closure member is preferably fabricated of die cast zinc.

Both plug 16 and cap 18 are force fit onto their respective tube end with plug 16 including a plurality of circumferentially spaced sharp ribs 20 raised from hollow collar 22 and adapted to bite the interior wall surface of tube 12. A wood screw 24 is positioned within the collar to be threaded and secured adhesively as with Loctite (TM) through the nose end of the plug for extending axially outward thereof. The nose end of the plug includes a shoulder 26 supporting a leg stand 28 and a flange-like collar 30 rotatably floating thereon. A plurality of circumferentially spaced axially extending prongs or teeth 32 are provided on collar 30. An annular groove 34 at the distal end of the nose receives an 0-ring gasket 36 whereby the stand 28 and collar 30 are retained in their free-floating relation about shoulder 26. A key 38 extending axially rearward from flange 40 is adapted to interfit within slot 42 of tube 14 for effecting a rotational interlock therewith for reasons as will be explained. For a larger spacing between joists in excess of 16 inches, an alternative interlock (FIG. 12) is provided for rotationally coupling the tubes in the form of a metal screw 56 secured into tube 12 and adapted to cooperate with a slot 58 in the end of tube 14.

Closure cap 18 at the opposite end includes a hollow sleeve 44 on which there is provided internally a plurality of axially extending sharp ribs 46 and a wedge-shaped key 48. The key is adapted to wedge into a force fit within slot 50 of tube 14 with the ribs effecting a biting relation with the tube periphery thereat. Extending axially outward through cap 18 is a wood screw 52 secured to the cap by threading along with a screw adhesive such as Loctite (TM). Disposed within the inner end of tube 12 is a plastic plug 54, shown in phantom. The plug serves to control air flow during collapse and expansion of the assembly so as to minimize the possibility of a dropout separation of tubes during the course of handling.

Figure 2:
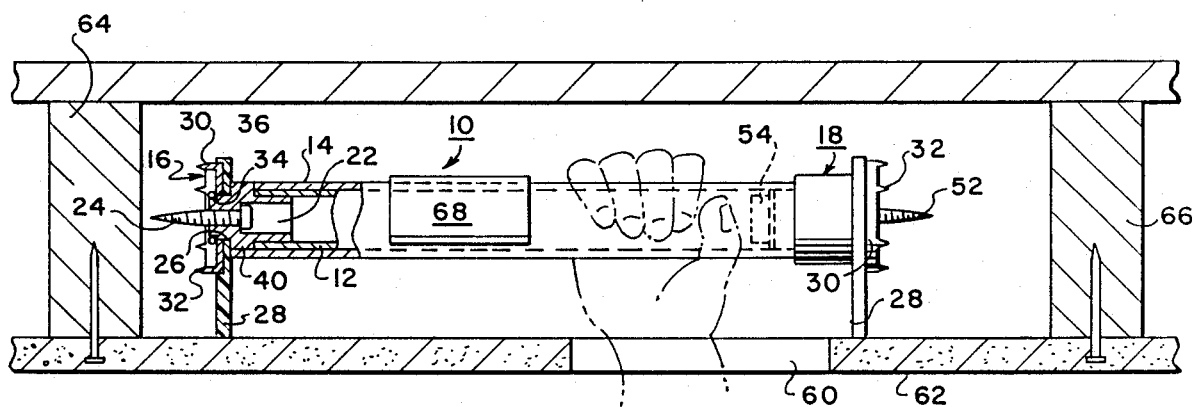
FIG. 2 is a side elevation partially sectioned of the hanger assembly in a pre-installation position.

As illustrated in FIG. 2, the hanger assembly 10 has been inserted through an opening 60 of a ceiling 62 for securing the assembly 10 between parallel wood joists 64 and 66. Opening 60 typically represents a four inch square opening for an electrical outlet box from which a fixture of sorts to be hung can be secured. To receive and secure a received outlet box there is provided a sap-on saddle 68 including side flanges 70 and 72. Saddle 68 is positioned in a snap-on relation over tube 14 and the flanges include apertures 74 which via screws 71 and nuts 73 dependently support a box 76 positioned over opening 60. Preferably, box 76 comprises a metal electrical outlet box of a type commercially available and modified as will be hereinafter described. It will be appreciated however that box 76 need not be utilized in combination with hanger assembly 10 where direct joist or stud mounting is available and can in fact be utilized with other hanger assemblies should the need to do so arise.

With reference now to FIGS. 4–9, the box 76 will now be described as will enable its load support capability to be substantially increased in accordance with the invention. As commercially marketed the electrical outlet box typically includes a rear or upper wall 78 joined to a plurality of depending side walls 80 to define an industry standard 1½ inch deep open interior 82. At opposite locations, chamfered corner walls 92 and 98 are bent inwards at their free ends for defining mounting ears 84 and 86. A threaded aperture 88 in each ear is adapted to receive a mounting screw. Typically contained in such boxes, is a horizontal slot 90 in corner side 92.

For enhancing the load capability of the box from its standard commercial form, the box has been modified in accordance with a first embodiment herewith to include a pair of localized indentations 94 and 96. Within each indentation, in axial alignment with the threaded aperture 88 of the ears, is an aperture 100. Surrounding the latter aperture is a plurality of radially extending depressed serrations 102 for reasons as will be understood. The indentations are raked at an angle A of about four degrees to about eight degrees with about six degrees being preferred.

Adapted to be received through apertures 100 for threaded engagement through apertures 88 is an elongated load screw 104. In a preferred embodiment the screw is a number 8–32 screw that has been case hardened. Integrally disposed along the underside of screw head 108 are a plurality of raised, radially extending teeth 106 spaced to match the spacing of serrations 102. The teeth 106 are of a height dimension B of about 0.060 inches. As the screws 104 are inserted through apertures 100 they are then threaded through ear apertures 88. With continued threading, the screw head 108 will eventually first hit the high side of indentations 94 or 96 and eventually the teeth 106 will initiate a seating interlock with serrations 102. At the same time, threading of the screw through the ears 84, 86 will cause some bending of the ears to occur. This also effects an interlock and in combination with the interlock effected between teeth 106 and serrations 102 a safety lock feature is provided against screw back out at such time as nut 110 is applied. By virtue of these modifications to an otherwise standard metal box 76, it has been established that the load capacity of the otherwise standard electrical outlet box is readily increased from about 10 pounds per ear to on the order of about 55 pounds per ear.

For further enhancement of the load capability for box 76 in combination with the load screws 104, there is optionally available a pair of U-shaped clips 112 comprised of an elongated central body portion 114 extending integral between a first lower offset leg 118 and a second upper offset leg 116. The clips are formed of spring steel about 7/16 inches wide and about 3/32 inches in thickness. The upper leg includes a V-shaped cutout 120 and the lower leg 118 includes an aperture 122 through which to receive screw 104 as specifically illustrated in FIGS. 8 and 9. As thereshown, a relatively shorter clip 112 is utilized for insertion of its upper leg within available slot 90 of corner side 92. Since a comparable slot is normally lacking in corner wall 98, the clip 112 is relatively longer for the upper leg 116 to snap fit onto the upper or rear wall 78. When installed, cutout 120 extends in FIG. 8 about nut head 108 and in FIG. 9 about the shank of screw 104.

Figure 13:
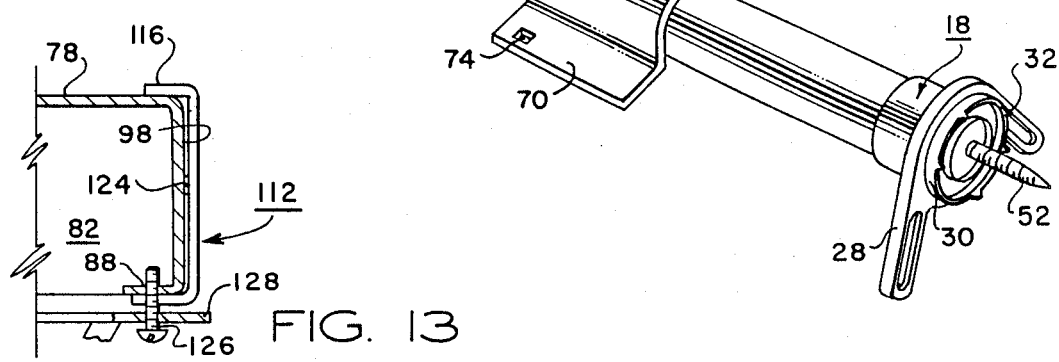
FIG. 13 is a fragmentary side view similar to FIG. 8 for an alternative embodiment utilizing the clips of FIG. 7.

As an alternative to the use of load screws 104, the clips 112 can be utilized alone without the load screws as illustrated in FIG. 13 to achieve a capacity loading of about 55 pounds per ear. The clips can be assembled onto the box as before or previously attached permanently as by a tack weld 124. For this embodiment a conventional load screw 126 is inserted in a conventional manner through the underside of the ears to secure a load mounting bracket 128 or the like.

Figure 3:
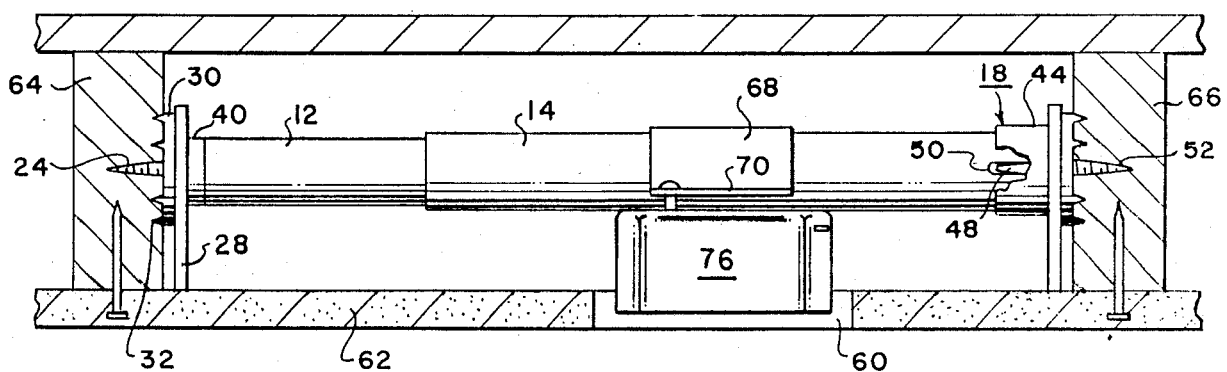
FIG. 3 is a side elevation similar to FIG. 2 with the hanger assembly in installed position.

To effect installation, the hanger assembly 10 is first inserted through opening 60 and placed on the top side of the ceiling 62 for support thereat parallel to the ceiling by means of leg stands 28. The tubes 12 and 14 in their collapsed relation are interlocked together by means of key 38 interfitting in slot 42. Optionally when required for enlarged joist spacings, the interlock is effected between screw 56 and slot 58. With a hand grip about the outer tube 14, the assembly is urged leftward as illustrated in FIG. 2 until screw 24 engages with the side surface of joist 64. By then rotating the interlocked tubes in unison, the screw 24 is caused to penetrate joist 64 while drawing the entire assembly leftward until collar prongs 32 effect a gripping anchored engagement therewith as illustrated in FIG. 3. After the left side installation is completed, tubular members 12 and 14 are relatively expanded until the opposite screw 52 effects similar engagement against joist 66. With the interlock released, hand rotation of tube 14 alone will cause screw 52 to penetrate joist 66 while drawing collar prongs 32 thereat into a gripping anchored engagement against the side surface of joist 66. Being of a telescopic construction, the hanger assembly will breathe along with any temperature induced spacing changes between joists.

Once the hanger assembly is fully secured and positioned, the saddle 68 will normally be located overlying the opening 60. Should relocation be required the saddle can be readily released and replaced snap fit at the proper location. Box 76 can then be conveniently attached to the saddle flanges by means of screws 71 and lock nuts 73.

Depending on the anticipated loading for the fixture to be hung onto box 76, the conventional electrical outlet box 76 will normally have already been modified to accommodate the reinforcement load screws 104. This increases load capacity to on the order of 55 pounds per ear and may optionally be further increased to a load capacity of about 200 pounds per ear by additionally utilizing side clips 112 in combination with the load screws. Where preferred, the clips 112 can be installed on a conventional outlet box unmodified or modified as described without the use of load screws 104. In either embodiment, the clips can be provided as a kit for load upgrade of an outlet box.

By the above description there is disclosed a novel hanger assembly which an be readily installed by one skilled workman at an average installation time of on the order of about five minutes on average. At the same time, use of costly machined parts in the manner of the prior art hangers is completely avoided while the possibility to incur jacking of the joists or studs in the course of installation is eliminated. When the hanger assembly is utilized in combination with the modified electrical outlet box hereof, the load capacity of the installed hanger assembly is substantially increased over that previously available. Yet this is achieved with a minimum of structural items that can be readily fabricated at nominal cost. The virtues thereof are many in satisfying a long felt need in this particular industry not least of which is the capability of a one man installation from a location below a ceiling rather than above.

Since many changes could be made in the above construction and many apparently widely different embodiments of this invention can be made without departing from the scope thereof, it is intended that all matter contained in the drawings and specification shall be interpreted as illustrative and not in a limiting sense.

I claim:

1. A hanger assembly for spanning and positive attachment between a pair of spaced joists, studs and the like elements having opposed surfaces and comprising:
    a single pair of first and second interfitting tubular members telescopically slidable rectilinearly one within the other and relatively extandable between a first generally overlapping relation and a second relatively expanded relation;
    a first and second plurality of element engaging means respectively mounted on the distal ends of each of said tubular members;
    screw means rotationally secured and axially extending from the distal end of each of said tubular members for pre-engaging their respective elements and effective when threadedly rotated to draw their respective element engaging means into engagement against the corresponding element thereat; and
    interlocking means having at least two distinctively spaced apart settings corresponding to said first relation in which to interlock said tubular members against relative rotation, said distinctive settings being predetermined to accommodate different construction spacings between said elements whereby at each of said settings said interlock means is operatively effective to enable said tubular members to rotate in unison when a first of said screw means is threadingly rotated into attachment with its corresponding element.

2. A hanger assembly in accordance with claim 1 in which in said interlock means is released of said interlock when said tubular members are in said second relation enabling the second of said tubular members to be independently rotated for threadingly rotating the second of said screw means into attachment with its corresponding element.

3. A hanger assembly in accordance with claim 2 in which the distal end of each of said tubular members includes a closure member secured thereto, said screw means is secured extending axially outward through the end face of each of said closure members and said element engaging means are mounted for a floating support on the exposed end of said closure members about the screw means therein.

4. A hanger assembly in accordance with claim 3 in which said closure members are each secured in a force fit relation to the respective distal ends of said tubular members and at least one of said closure members is secured by a wedged interfit with the distal end of the tubular member to which it is secured.

5. A hanger assembly in accordance with claim 3 including a support stand disposed intervening between each of aid closure members and said element engaging means in a free floating relation therewith for effecting the floating support of said element engaging means while providing a controlled spacing support of said tubular members relative to the surface plane of an interior wall surface at which installation is to be effected.

6. A hanger assembly in accordance with claim 3 including a longitudinally presettable saddle means releasably mounted on said tubular members and to which a dependent support can be secured for attaching an item to be hung.

7. A hanger assembly in accordance with claim 6 including a dependent support comprising a box structure having item support ears for supporting an item load of greater than 10 pounds per ear.

8. A hanger assembly in accordance with claim 7 in which said dependent support comprises an electrical outlet box of metal composition that includes first threaded apertures within said support ears extending opposed inward along its open face, there is provided second apertures disposed through its closed face in substantial coaxial alignment with the threaded apertures of said ears and an elongated load screw extends through said second apertures threaded into the first threaded apertures of said ears.

9. A hanger assembly in accordance with claim 8 in which the surface of said closed face about each of said second apertures includes local indentations, there is included a plurality of depressed serrations formed in said indentations and said elongated load screw includes ribs on the underside of its head for effecting a cooperative interlock with said serrations against relative rotation therebetween.

10. A hanger assembly in accordance with claim 8 including clip members mounted onto the side of said outlet box from an underlying relation with said box ears to provide reinforcement for supporting an item load of greater than about 55 pounds per ear.

11. A hanger assembly in accordance with claim 9 in which each of said local indentations extend angularly inward from the face plane of said box at an angle of about four degrees to about eight degrees.

12. A hanger assembly in accordance with claim 11 in which the angle of said indentations is about six degrees.

13. A hanger assembly in accordance with claim 2 in which the rotation of said tubular members is capable of being effected by a manual hand force rotationally applied against the respective surface peripheries of said tubular members.

14. In a support box for supporting an item to be hung from a ceiling or wall, said box being open at one face and closed on the other face and a pair of ears oppositely extending inward along the open face with each ear having a threaded aperture for receipt of a screw by which an item to be hung can be attached, the improvement for adapting said box to support an attached load of greater than about 10 pounds per ear, said improvement comprising second apertures defined through the closed face of said box at locations substantially aligned coaxially with the threaded apertures of said ears and an elongated load screw extending through said second apertures and threadedly extending through the threaded apertures of said ears to beyond said ears.

15. In a support box in accordance with claim 14 in which said box comprises an electrical outlet box of metal composition and the surface of said closed box about each of said second apertures includes a local indentation, there is included a plurality of depressed serrations formed in said indentations and said elongated load screw includes ribs on the underside of its head for effecting a cooperative interlock with said serrations against relative rotation therebetween.

16. In a support box in accordance with claim 15 including clip members mounted onto the side of said outlet box from an underlying relation with said box ears to provide reinforcement for supporting an item load greater than about 55 pounds per ear.

17. In a support box in accordance with claim 15 in which each said local indentations extend angularly inward from the face plane of said box at an angle of about four degrees to about eight degrees.

18. In a support box in accordance with claim 17 in which the angle of said indentations is about six degrees.

19. In a support box for supporting an item to be hung from a ceiling or wall, said box being open at one face and closed on the other face and a pair of ears oppositely extending inward along the open face with each ear having a threaded aperture for receipt of a screw by which an item to be hung can be attached, the improvement for adapting said box to support an attached load of greater than about 10 pounds per ear, said improvement comprising clip members mounted onto the side of said outlet box from an underlying relation with said box ears to provide reinforcement for supporting an item load to be supported from said ears.

20. In a support box in accordance with claim 19 in which said box comprises an electrical outlet box of metal composition and said clips have a generally U-shaped configuration for effecting a cooperative interfit with said box.

21. A hanger assembly for spanning and positive attachment between a pair of spaced joists, studs and the like elements having opposed surfaces and comprising:
   a pair of first and second interfitting tubular members telescopically slidable rectilinearly one within the other and relatively extendable between a first generally overlapping relation and a second relatively expanded relation;
   a first and second plurality of element engaging means respectively mounted in a floating support on the distal end of each of said tubular members;
   a closure member secured at the distal end of each of said tubular members;
   screw means rotationally secured and axially extending outward through the end face of each of said closure members for pre-engaging their respective elements and effective when threadedly rotated to draw their respective element engaging means into engagement against the corresponding element thereat;
   interlocking means operatively effective at a predetermined overlap of said tubular members in said first relation to secure said tubular members against relative rotation for said tubular members to rotate in unison when a first of said screw means is threadingly rotated into attachment with its corresponding element and operatively release when said tubular members are in said second relation enabling the second of said tubular members to be independently rotated for threadingly rotating the second of said screw means into attachment with its corresponding element;
   a saddle means releasably mounted on said tubular member and to which a dependent electrical outlet box can be secured for attaching an item to be hung; said electrical outlet box being of metal composition having appertures within support ears extending inwardly opposed along its open face; and clip members mountable onto the side of said outlet box from an underlying relation with said box ears for effecting an item load support of greater than 10 pounds per ear.

* * * * *